(12) United States Patent
Kim

(10) Patent No.: US 12,722,698 B2
(45) Date of Patent: Sep. 1, 2026

(54) SYSTEM AND METHOD OF CONTROLLING FOUR-WHEEL INDEPENDENT STEERING SYSTEM

(71) Applicant: HYUNDAI MOBIS CO., LTD., Seoul (KR)

(72) Inventor: Tae Hong Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 49 days.

(21) Appl. No.: 18/768,594

(22) Filed: Jul. 10, 2024

(65) Prior Publication Data

US 2025/0187657 A1 Jun. 12, 2025

(30) Foreign Application Priority Data

Dec. 6, 2023 (KR) ........................ 10-2023-0175589

(51) Int. Cl.
*B62D 6/00* (2006.01)
*B62D 1/12* (2006.01)
*B62D 7/15* (2006.01)

(52) U.S. Cl.
CPC ............... *B62D 6/008* (2013.01); *B62D 1/12* (2013.01); *B62D 7/1581* (2013.01)

(58) Field of Classification Search
CPC ........ B62D 6/008; B62D 1/12; B62D 7/1581; B62D 7/1509; B62D 5/006; B62D 5/046; B60Y 2400/30; B60Y 2400/83; B60Y 2400/84
See application file for complete search history.

(56) References Cited

FOREIGN PATENT DOCUMENTS

| | | | | |
|---|---|---|---|---|
| CN | 112977595 A * | 6/2021 | ............... | B62D 1/12 |
| JP | 4933699 B2 * | 5/2012 | | |
| KR | 10-2023-0090613 A | 6/2023 | | |

OTHER PUBLICATIONS

Machine Translation of JP-4933699-B2 PDF File Name: "JP4933699B2_Machine_Translation.pdf" (Year: 2012).*
Machine Translation of CN-112977595-A PDF File Name: "CN112977595A_Machine_Translation.pdf" (Year: 2021).*

* cited by examiner

*Primary Examiner* — Grant Moubry
*Assistant Examiner* — Ruben Picon-Feliciano
(74) *Attorney, Agent, or Firm* — Morgan, Lewis & Bockius LLP

(57) ABSTRACT

A control system for a four-wheel independent steering system includes at least one sensor configured to detect at least one of a shift position of a joystick, mounted on the four-wheel independent steering system, or a driving speed of a vehicle, and a position controller configured to control a position of the joystick based on sensing data detected by the at least one sensor.

9 Claims, 6 Drawing Sheets

130
Target angle
201
LPF
210
+
-
Current angle
202
Kp
220
230
Speed command
203
LPF
240
Derivative
250
Kd
260
current Compensation command
204

SYSTEM AND METHOD OF CONTROLLING FOUR-WHEEL INDEPENDENT STEERING SYSTEM

CROSS-REFERENCE TO RELATED APPLICATION

This application claims priority from and the benefit of Korean Patent Application No. 10-2023-0175589, filed on Dec. 6, 2023, which is hereby incorporated by reference for all purposes as if set forth herein.

BACKGROUND

Field

Embodiments of the present disclosure relate to a system and method of controlling a four-wheel independent steering system using a joystick.

Discussion of the Background

Joysticks mounted on a four-wheel independent steering system may provide intuitive control of crabs, spins, or the like, and eliminate steering wheels and pedals, which provides high space utilization. This may be more effective for autonomous vehicles.

However, when controlling with a joystick during driving, the lateral forces or yaw rates generated during turning may cause the driver to veer to one side, leading to situations where the joystick is unintentionally manipulated to render desired steering manipulation impossible.

This may cause a very dangerous situation and require a secondary control. In addition, joysticks have a more limited manipulation radius than steering wheels, so the joysticks require a way to effectively control a steering angle of driving wheels with a small amount of control.

SUMMARY

Various embodiments are directed to a four-wheel independent steering system control system and method capable of improving control stability and efficiency of a vehicle equipped with a four-wheel independent steering system and a joystick.

In an embodiment, a control system for a four-wheel independent steering system includes: at least one sensor configured to detect at least one of a shift position of a joystick, mounted on the four-wheel independent steering system, or a driving speed of a vehicle; and a position controller configured to control a position of the joystick based on sensing data detected by the at least one sensor.

The at least one sensor may include at least one of a shift position sensor configured to detect whether a shift position of the joystick is a D-stage (driving) or an R-stage (reverse); or a speed sensor configured to measure the driving speed of the vehicle to detect a driving state of the vehicle, wherein the position controller controls the joystick to maintain a preset target steering angle via a left-right switching control motor associated with the joystick in response to detecting the shift position of the joystick to be the D-stage or the R-stage, or in response to detecting the vehicle is in the driving state.

The preset target steering angle may be preset to 0 degree relative to a left-right direction of the joystick.

The at least one sensor may further include a position sensor configured to detect a current steering angle of the joystick based on a control output of the left-right switching control motor associated with the joystick, and the position controller may control the position of the joystick by receiving the current steering angle detected via the position sensor as a feedback signal to compensate for a command current applied to the left-right switching control motor.

The position controller may include a proportional-differential (PD) controller and may be configured to output a command speed through tuning of a gain of a proportional controller based on the vehicle speed, and a compensated command current by error compensation of a steering angle through tuning of a gain of a non-interfering differential (D) controller of the PD controller based on a steering angle error value resulting from a difference between a current steering angle and a target steering angle of the joystick.

In an embodiment, a control system for a four-wheel independent steering system further includes: a speed controller including a proportional-integral (PI) controller and configured to calculate a speed error value based on a difference between a command speed output from the position controller and a vehicle motor speed, to compensate for the speed error through tuning of a gain of an integral (I) controller of the PI controller based on the speed error value to output a compensated command speed, and to apply the compensated command current output from the position controller to the output compensated command speed to output a command current via a P controller of the PI controller; and a current controller including the PI controller and configured to compensate for a current error between a command current output from the speed controller and a sensor current obtained through sensing of the motor to output a final command current, wherein the position controller applies the final command current output via the current controller to a left-right switching control motor associated with the joystick.

The position controller may include a disturbance observer (DOB) configured to model the position of the joystick as a first-order function based on a steering angle error value resulting from a difference between the current steering angle and the target steering angle of the joystick and disturbance caused by yaw rates or lateral forces generated during driving of the vehicle to generate a joystick transfer function, convert the generated joystick transfer function into an inverse transfer function and pass the inverse transfer function through a Q-filter, and to perform feedback control based on an output of the inverse transfer function passed through the Q-filter to compensate for a command current.

In an embodiment, a method of controlling a four-wheel independent steering system includes steps of: detecting, by at least one sensor, at least one of a shift position of a joystick, mounted on the four-wheel independent steering system, or a driving speed of a vehicle; and controlling, by a position controller, a position of the joystick based on sensing data detected by the at least one sensor.

The step of detecting may include at least one of detecting, by a shift position sensor of the at least one sensor, whether the shift position of the joystick is a D-stage (driving) or an R-stage (reverse); and detecting, by a speed sensor of the at least one sensor, measuring the driving speed of the vehicle to detect a driving state of the vehicle, wherein the step of controlling may include maintaining a preset target steering angle via a left-right switching control motor associated with the joystick in response to detecting the shift position of the joystick to be the D-stage or the R-stage, or in response to detecting the vehicle is in the driving state.

The step of controlling may include receiving a current steering angle detected via a position sensor as a feedback signal to compensate for a command current applied to the left-right switching control motor; and actuating the left-right switching control motor with the compensated command current to control the shift position of the joystick.

Further details of other embodiments are included in the detailed description and accompanying drawings.

According to embodiments of the present disclosure, control stability and efficiency of the vehicle equipped with the four-wheel independent steering system and the joystick may be improved, thereby allowing the driver to drive the vehicle more comfortably.

DETAILED DESCRIPTION OF THE ILLUSTRATED EMBODIMENTS

Figure 1:
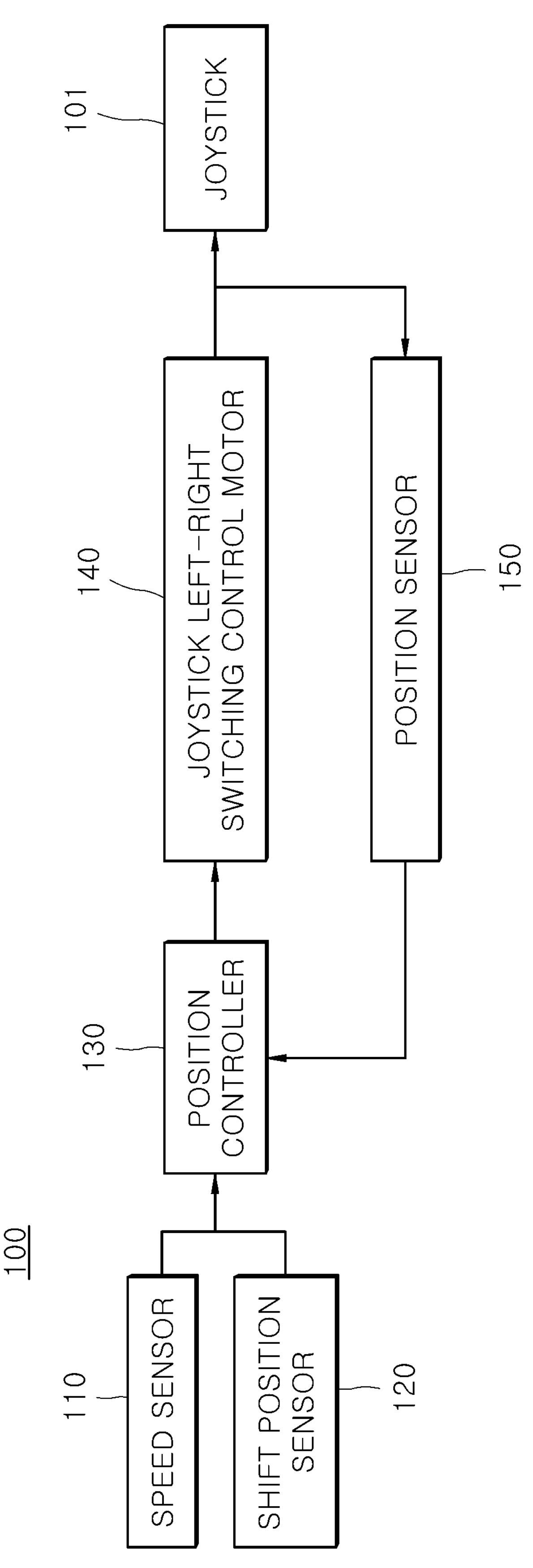
FIG. 1 is a block diagram illustrating a control system for a four-wheel independent steering system according to an embodiment of the present disclosure.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous.

In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, embodiments that include other components in addition to the components described in the various embodiments are also included in the scope of the present disclosure.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, when a component is referred to as being "linked," "coupled," or "connected" to another component, it is understood that not only a direct connection relationship but also an indirect connection relationship through an intermediate component may also be included. In addition, when a component is referred to as "comprising" or "having" another component, it may mean further inclusion of another component not the exclusion thereof, unless explicitly described to the contrary.

In the present disclosure, the terms first, second, etc. are used only for the purpose of distinguishing one component from another, and do not limit the order or importance of components, etc., unless specifically stated otherwise. Thus, within the scope of this disclosure, a first component in one exemplary embodiment may be referred to as a second component in another embodiment, and similarly a second component in one exemplary embodiment may be referred to as a first component.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, exemplary embodiments that include other components in addition to the components described in the various embodiments are also included in the scope of the present disclosure.

FIG. 1 is a block diagram illustrating a control system for a four-wheel independent steering system according to an embodiment of the present disclosure.

Referring to FIG. 1, the control system 100 for a four-wheel independent steering system according to the embodiment of the present disclosure may include a speed sensor 110, a shift position sensor 120, a position controller 130, a joystick left-right switching control motor 140, and a position sensor 150.

The speed sensor 110 may detect a driving speed of a vehicle. Specifically, the speed sensor 110 may measure the driving speed of the vehicle to detect a driving state of the vehicle.

The shift position sensor 120 may detect a shift position of a joystick mounted on a four-wheel independent steering system. Specifically, the shift position sensor 120 may detect whether the shift position of the joystick is in a D-stage (driving) or an R-stage (reverse).

The position controller 130 may control a position of the joystick 101 based on sensing data detected via the sensors 110 and 120.

In other words, the position controller 130 may control the joystick 101 to maintain a preset target steering angle via the joystick left-right switching control motor 140 if the shift position of the joystick is detected to be in the D-stage or R-stage via the shift position sensor 120, or if the vehicle is detected to be driving via the speed sensor 110.

Here, the target steering angle may be preset to 0 degree relative to the left-right direction of the joystick 101.

Figure 2:
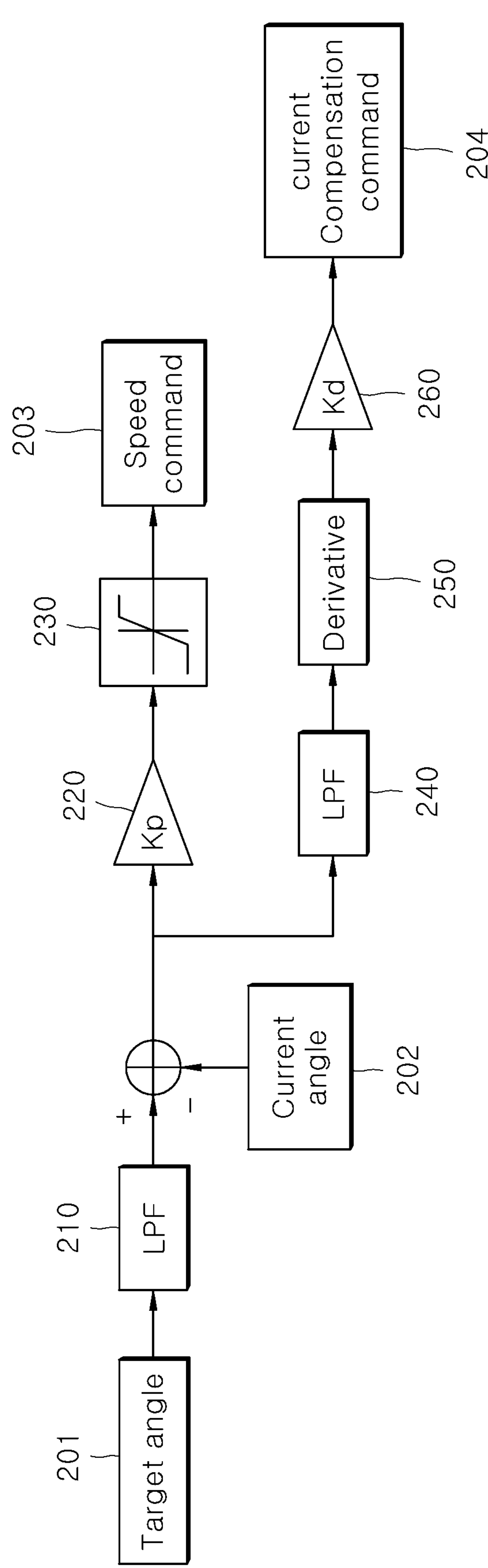
FIG. 2 is a block diagram illustrating a circuit configuration of a position controller according to an embodiment of the present disclosure.

To this end, the position controller 130 may include a proportional-differential (PD) controller as illustrated in FIG. 2.

Referring further to FIG. 2, the position controller 130 may apply a low pass filter (LPF) 210 to remove noise when the target steering angle is input. The maximum control frequency band for the control reference of the joystick 101 is at the level of 4 Hz such that a marginal cutoff frequency is set to 6 Hz. Since the vehicle speed is affected by disturbance as the vehicle speed increases, a gain 220 of a P controller 230 may be tuned in response to the vehicle speed to improve the control stability. In other words, the position controller 130 may output a speed command 203 by tuning of a Kp gain 220 of the P controller 230 based on the vehicle speed.

At this time, a non-interfering D controller 250 may be further applied for faster response. Typical D control integrates the control output with the P control to derive a final speed control command value, but in this embodiment, the D control may compensate directly for a current command output for faster response.

That is, the position controller 130 may compensate for a steering angle error by tuning of a gain 260 of the non-interfering D controller 250 based on the steering angle error value resulting from a difference between a current steering angle 202 and a target steering angle 201 to output a current compensation command 204.

Here, the non-interfering D controller 250 may be designed with an LPF 240 with a cutoff of 6 Hz to differentiate the amount of steering angle error and eliminate the resulting noise, and may be scaled to the appropriate current command level via a Kd gain 260 to apply the designed value directly to the current command.

Figure 3:
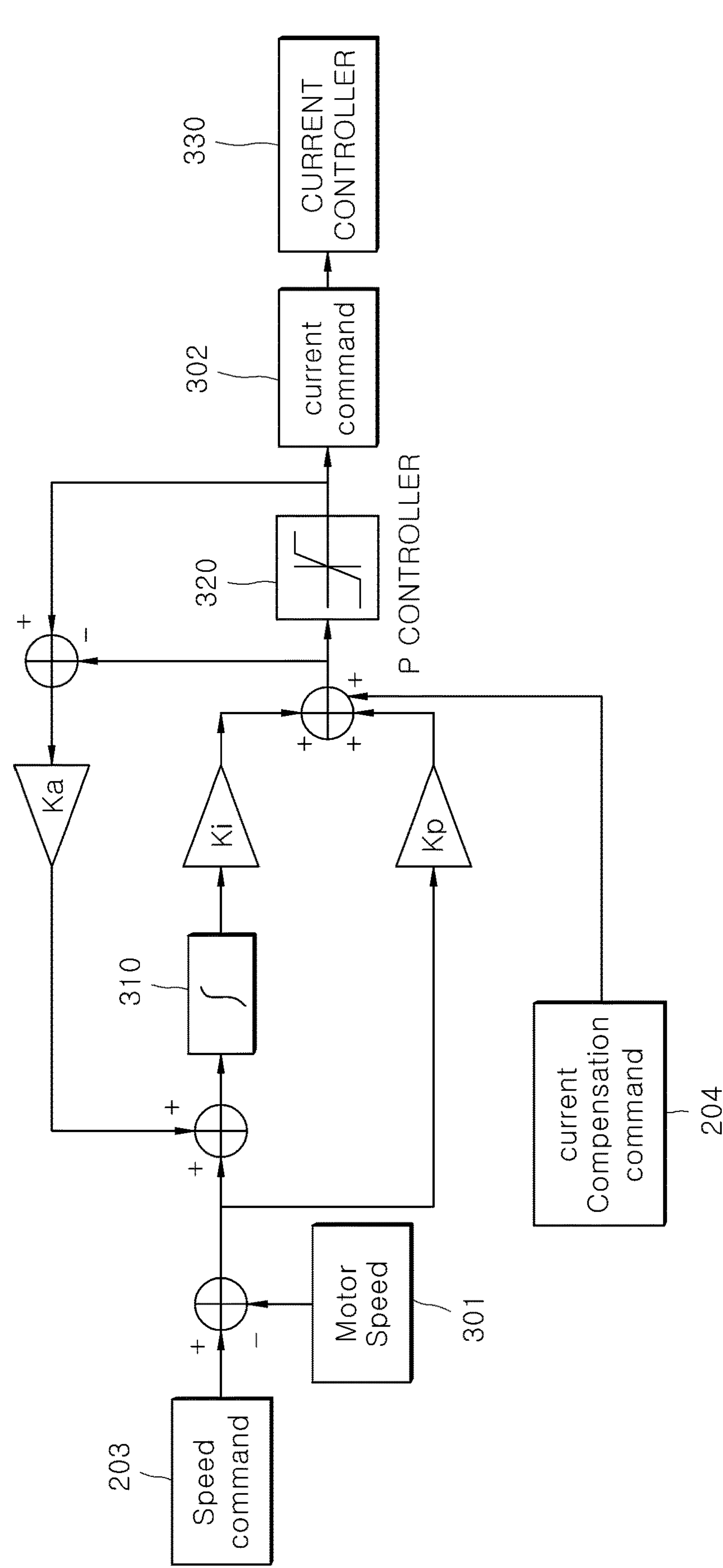
FIG. 3 is a diagram illustrating circuit configurations of a speed controller and a current controller according to an embodiment of the present disclosure.

The position controller 130 may be configured to be arranged in series with a speed controller 300 and a current controller 330 illustrated in FIG. 3 to perform the control operation. The speed controller 300 may include a proportional-integral (PI) controller. Here, the I-Term indicates that an anti-wind up controller may be applied to prevent cumulative error saturation. Further, the speed controller 300 may be designed such that an output of the non-interfering D controller 250 from the position controller 130 is added to an output of the speed controller 300 and an added value is output as a final control current value.

Referring further to FIG. 3, the speed controller 300 may calculate a speed error value based on a difference between a speed command 203 output from the position controller 130 and a motor speed 301 of the vehicle. The speed controller 300 may compensate for the speed error by tuning of a gain of an integral (I) controller 310 based on the speed error value to output a compensated command speed, and apply a current compensation command 204 output from the position controller 130 to the output compensated command speed to output a command current 302 via a P controller 320.

The current controller 330 may include a PI controller. The current controller 330 may output a final command current by compensating for a current error between the command current 302 output from the speed controller 300 via the PI controller and a sensor current obtained by sensing of a motor.

Accordingly, the position controller 130 may apply the final command current output via the current controller 330 to the joystick left-right switching control motor 140. Therefore, the position controller 130 may control the shift position of the joystick 101 to maximize the stability and efficiency of the vehicle.

Figure 4:
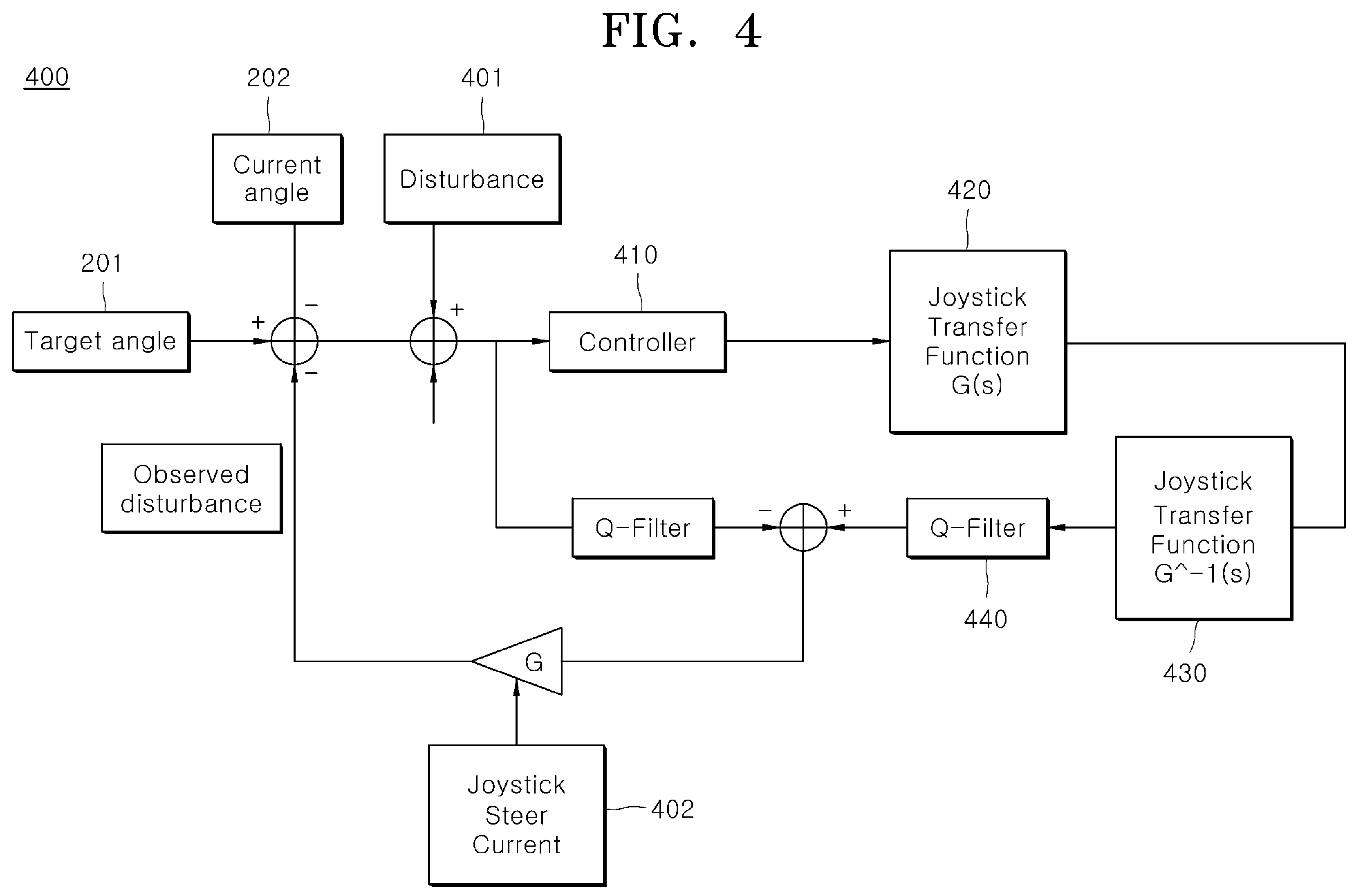
FIG. 4 is a diagram illustrating a circuit configuration of a DOB according to an embodiment of the present disclosure.

In another embodiment, the position controller 130 may be configured to perform the control operation using the PD controllers 230 and 250 illustrated in FIG. 2 and a disturbance observer (DOB) 400 illustrated in FIG. 4. In other words, the position controller 130 may control the shift position of the joystick 101 by compensating for the command current applied to the joystick left-right switching control motor 140 via a DOB 400-based feedback structure.

Referring further to FIG. 4, the DOB 400 may calculate a steering angle error value based on a difference between the current steering angle 202 and the target steering angle 201 of the joystick 101, and may receive a disturbance 401 caused by yaw rates or lateral forces generated during driving of the vehicle.

The DOB 400 may model the shift position of the joystick 101 as a first order function based on the steering angle error value and the disturbance 401 to generate a joystick transfer function 420. For this purpose, the DOB 400 may include a controller 410. That is, the DOB 400 may generate the joystick transfer function 420 via the controller 410.

The DOB 400 may convert the generated joystick transfer function 420 into an inverse transfer function 430, pass the inverse transfer function through a Q-filter 440, and compensate for the command current through feedback control based on the output of the inverse transfer function 430 passed through the Q-filter 440.

The joystick transfer function 420, G(s), should be designed to have a high order of a denominator, because if it is processed with an inverse function, the order of a numerator will be high, making the control system unstable and the output may only be controlled by predicting the output in advance. Therefore, the DOB 400 may be stabilized by additionally applying an LPF as the Q-filter 440, and a desired disturbance extraction bandwidth may also be adjusted through adjustment of the cutoff frequency.

The pole and zero values of the transfer function for which the disturbance is compensated may be derived directly from the actual vehicle through tuning or the system ID. The Q-filter 440 may be designed as an LPF with a cutoff frequency of 20 Hz. The cutoff frequency value may be determined by tuning on the actual vehicle or by considering the desired noise rejection region through simulation results. If the joystick steer current 402 becomes large, i.e., if the driver is forced to steer from side to side, the required output of the DOB 400 may increase or oscillations may occur, so a tuning map may be applied to adjust the output of the DOB 400 accordingly.

The joystick left-right switching control motor 140 may receive a command current value from the position controller 130 and control the shift position of the joystick 101.

The position sensor 150 may detect the current steering angle of the joystick 101 based on the control output of the joystick left-right switching control motor 140. The position controller 130 may receive the current steering angle detected via the position sensor 150 as a feedback signal and compensate for the command current applied to the joystick left-right switching control motor 140 to control the shift position of the joystick 101.

Figure 5:
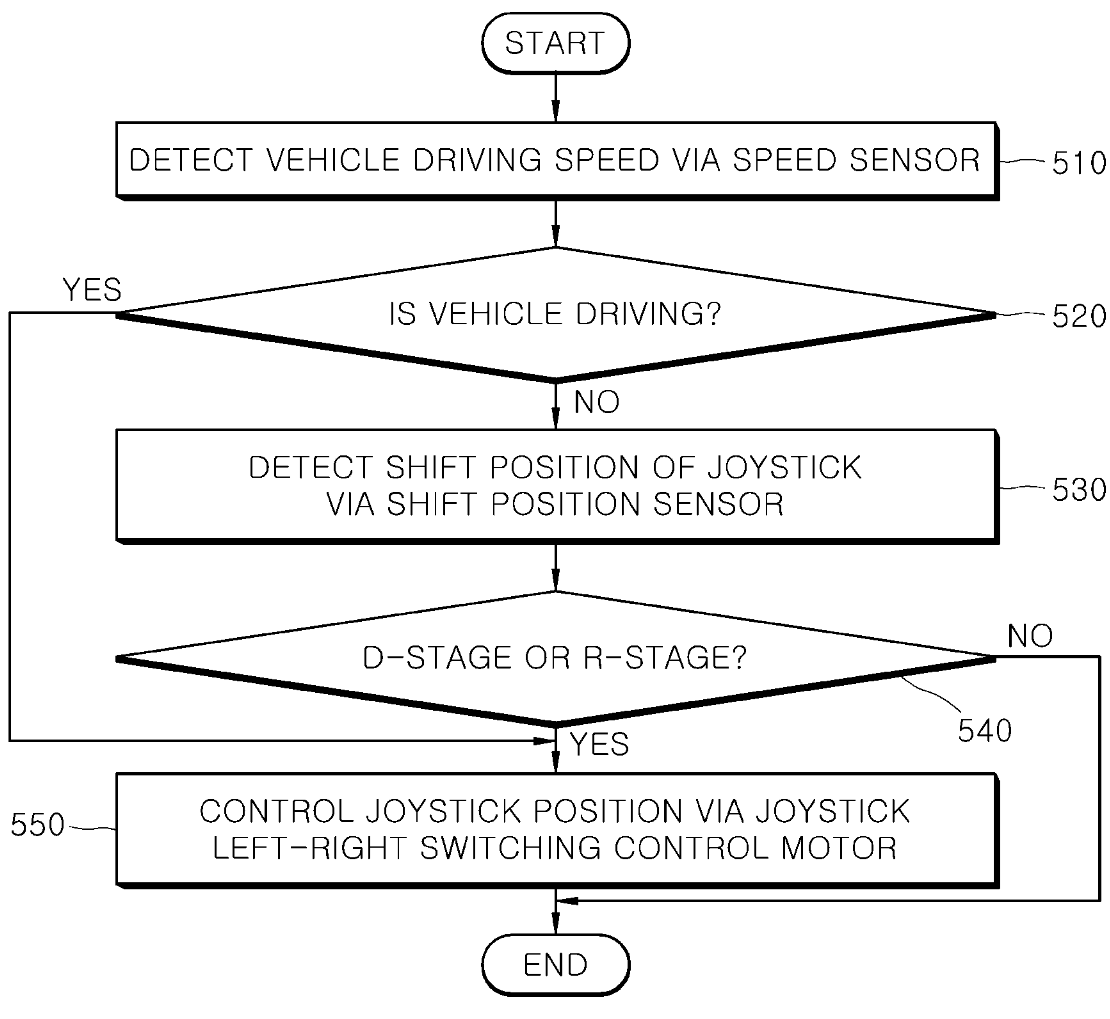
FIGS. 5 and 6 are flow diagrams illustrating a control method for a four-wheel independent steering system according to an embodiment of the present disclosure.
Figure 6:
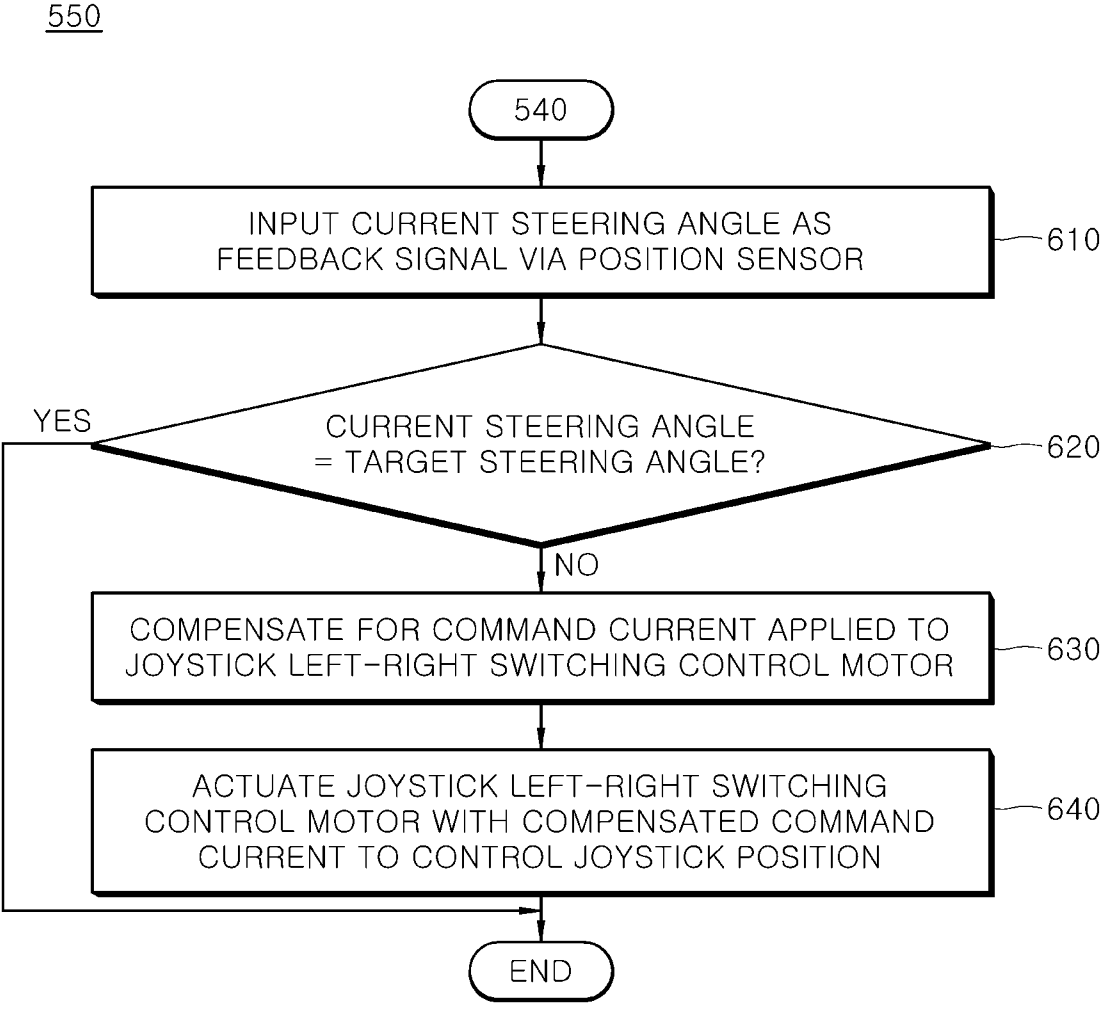

FIGS. 5 and 6 are flow diagrams illustrating a control method for a four-wheel independent steering system according to an embodiment of the present disclosure.

The four-wheel independent steering system control method described herein is merely an embodiment of the present disclosure, and various other stages may be added as needed, and the stages described below may also be implemented in a different order, so that the present disclosure is not limited to each of the stages described below and the order thereof.

Referring to FIG. 5, in stage 510, the control system 100 for a four-wheel independent steering system may detect a driving speed of the vehicle via the speed sensor 110.

If it is detected that the vehicle is not driving ("NO" in 520), in stage 530, the control system 100 for a four-wheel independent steering system may detect a shift position of the joystick 101 via the shift position sensor 120.

If it is detected that the shifting position of the joystick 101 is in a D-stage or R-stage ("YES" in 540), in stage 550, the control system 100 for a four-wheel independent steering system may apply a command current to the joystick left-right switching control motor 140 via the position controller 130, so as to control the shift position of the joystick 101 via the joystick left-right switching control motor 140. The stage 550 may also be executed if the vehicle is detected to be driving in 520 ("YES" in 520).

On the other hand, if it is detected in stage 540 that the joystick 101 is not shifted into the D-stage or R-stage ("NO" in 540), the present embodiment may be terminated.

Hereinafter, the above stage 550 will be described in detail with reference to FIG. 6.

First, in stage 610, the control system 100 for a four-wheel independent steering system may receive the current steering angle detected via the position sensor 150 as a feedback signal.

At this time, if the current steering angle and the target steering angle do not match ("NO" in 620), in stage 630, the control system 100 for a four-wheel independent steering system may compensate for the command current applied to the joystick left-right switching control motor 140 via the position controller 130.

Next, in stage 640, the control system 100 for a four-wheel independent steering system may control the shift position of the joystick 101 by actuating the joystick left-right switching control motor 140 with the compensated command current.

Meanwhile, in stage 620, if the current steering angle and the target steering angle match ("YES" in 620), the present embodiment may be terminated.

Although the above embodiments have been described by way of limited examples and drawings, various modifications and variations from the above description will be apparent to one of ordinary skill in the art. For example, although the described techniques may be performed in a different order than described, and/or components of the described systems, structures, devices, circuits, etc. may be combined or assembled in a different form than described, or substituted or replaced by other components or equivalents, suitable results may be achieved.

Therefore, other implementations, other embodiments, and equivalents to the claims are also within the scope of the following claims.

What is claimed is:

1. A control system for a four-wheel independent steering system, the control system comprising:

at least one sensor configured to detect at least one of a shift position of a joystick, mounted on the four-wheel independent steering system, or a driving speed of a vehicle; and a position controller configured to control a position of the joystick based on sensing data detected by the at least one sensor, wherein the position controller comprises a disturbance observer (DOB) configured to model the position of the joystick as a first-order function based on a steering angle error value resulting from a difference between a current steering angle and a target steering angle of the joystick and disturbance caused by yaw rates or lateral forces generated during driving of the vehicle to generate a joystick transfer function, to convert the generated joystick transfer function into an inverse transfer function and pass the inverse transfer function through a Q-filter, and to perform feedback control based on an output of the inverse transfer function passed through the Q-filter to compensate for a command current.

2. The control system of claim 1, wherein the at least one sensor comprises:

at least one of a shift position sensor configured to detect whether a shift position of the joystick is a D-stage (driving) or an R-stage (reverse); or a speed sensor configured to measure the driving speed of the vehicle to detect a driving state of the vehicle, wherein the position controller controls the joystick to maintain a preset target steering angle via a left-right switching control motor associated with the joystick in response to detecting the shift position of the joystick to be the D-stage or the R-stage, or in response to detecting that the vehicle is in the driving state.

3. The control system of claim 2, wherein the preset target steering angle is preset to 0 degree relative to a left-right direction of the joystick.

4. The control system of claim 2, wherein the at least one sensor further comprises a position sensor configured to detect a current steering angle of the joystick based on a control output of the left-right switching control motor associated with the joystick, wherein the position controller controls the position of the joystick by receiving the current steering angle detected via the position sensor as a feedback signal to compensate for a command current applied to the left-right switching control motor.

5. The control system of claim 1, wherein the position controller comprises a proportional-differential (PD) controller and is configured to output a command speed through tuning of a gain of a proportional controller based on the driving speed of the vehicle, and a compensated command current by error compensation of a steering angle through tuning of a gain of a non-interfering differential (D) controller of the PD controller based on a steering angle error value resulting from a difference between a current steering angle and a target steering angle of the joystick.

6. The control system of claim 5, further comprising:

a speed controller including a proportional-integral (PI) controller and configured to calculate a speed error value based on a difference between a command speed output from the position controller and a vehicle motor speed, to compensate for the speed error value through tuning of a gain of an integral (I) controller of the PI controller based on the speed error value to output a compensated command speed, and to apply the compensated command current output from the position controller to the outputted compensated command speed to output a command current via a P controller of the PI controller; and a current controller including the PI controller and configured to compensate for a current error between a command current output from the speed controller and a sensor current obtained through sensing of the motor to output a final command current, wherein the position controller applies the final command current output via the current controller to a left-right switching control motor associated with the joystick.

7. A method of controlling a four-wheel independent steering system, the method comprising steps of:

detecting, by at least one sensor, at least one of a shift position of a joystick, mounted on the four-wheel independent steering system, or a driving speed of a vehicle; and controlling, by a position controller, a position of the joystick based on sensing data detected by the at least one sensor, wherein the step of controlling comprises modeling the position of the joystick as a first-order function based on a steering angle error value resulting from a difference between a current steering angle and a target steering angle of the joystick and disturbance caused by yaw rates or lateral forces generated during driving of the vehicle to generate a joystick transfer function, converting the generated joystick transfer function into an inverse transfer function and pass the inverse transfer function through a Q-filter, and performing feedback control based on an output of the inverse transfer function passed through the Q-filter to compensate for a command current.

8. The method of claim 7, wherein the step of detecting comprises at least one of:

detecting, by a shift position sensor of the at least one sensor, whether the shift position of the joystick is a D-stage (driving) or an R-stage (reverse); or detecting, by a speed sensor of the at least one sensor, measuring the driving speed of the vehicle to detect a driving state of the vehicle, wherein the step of controlling further comprises maintaining a preset target steering angle via a left-right switching control motor associated with the joystick in response to detecting the shift position of the joystick to be the D-stage or the R-stage, or in response to detecting the vehicle is in the driving state.

9. The method of claim 7, wherein the step of controlling further comprises:

receiving a current steering angle detected via a position sensor as a feedback signal to compensate for a command current applied to a left-right switching control motor; and actuating the left-right switching control motor with the compensated command current to control the position of the joystick.

* * * * *